US012713361B2

United States Patent
(12) United States Patent
Buhari et al.

(10) Patent No.: US 12,713,361 B2
(45) Date of Patent: Aug. 18, 2026

(54) SYSTEMS FOR AND METHODS OF MULTILINK COMMUNICATION IN A NETWORK

(71) Applicant: Avago Technologies International Sales Pte. Limited, Singapore (SG)

(72) Inventors: Nizamudeen Mohamed Buhari, Bangalore (IN); Jimut Ranjan Sahoo, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 489 days.

(21) Appl. No.: 18/307,932

(22) Filed: Apr. 27, 2023

(65) Prior Publication Data

US 2024/0365248 A1 Oct. 31, 2024

(51) Int. Cl.

*H04W 52/32* (2009.01)
*H04W 52/02* (2009.01)
*H04W 52/24* (2009.01)
*H04W 76/10* (2018.01)

(52) U.S. Cl.

CPC ....... *H04W 52/32* (2013.01); *H04W 52/0277* (2013.01); *H04W 52/243* (2013.01); *H04W 76/10* (2018.02)

(58) Field of Classification Search

CPC ............. H04W 52/32; H04W 52/0277; H04W 52/243; H04W 84/12; H04W 72/0453; H04W 72/5411; H04W 76/15; H04W 76/10

See application file for complete search history.

(56) References Cited

U.S. PATENT DOCUMENTS

2020/0184787 A1* 6/2020 Emmanuel .............. H04L 41/12
2022/0418027 A1 12/2022 Takada

FOREIGN PATENT DOCUMENTS

WO WO-2019099268 A1 * 5/2019 ............ H04W 76/15
WO WO-2021/003181 A1 1/2021
WO WO-2021/011476 A1 1/2021

OTHER PUBLICATIONS

European Search Report on non-Foley case related to U.S. Appl. No. 18/307,932 DTD Oct. 16, 2024.

* cited by examiner

*Primary Examiner* — Jamal Javaid
(74) *Attorney, Agent, or Firm* — Foley & Lardner LLP

(57) ABSTRACT

Systems and methods can advantageously provide a protocol. A device using the protocol can include circuitry device configured to provide at least one frame while a connection is being established. The frame includes data indicating that the device is capable of a data management multilink (DMML) operation. In some examples, the frame is provided according to an 802.11 protocol.

20 Claims, 6 Drawing Sheets

SYSTEMS FOR AND METHODS OF MULTILINK COMMUNICATION IN A NETWORK

FIELD OF THE DISCLOSURE

This disclosure generally relates to systems for and methods of communication between an access point (AP) and a client device (e.g., a station (STA)) or between other communication devices. In some embodiments, this disclosure generally relates to systems for and methods of multilink (e.g., dual link) operations including but not limited to dual band operations.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA), etc. As higher data throughput and other changes develop, newer standards are constantly being developed for adoption, such as a progression from IEEE 802.11n to IEEE 802.11ac.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
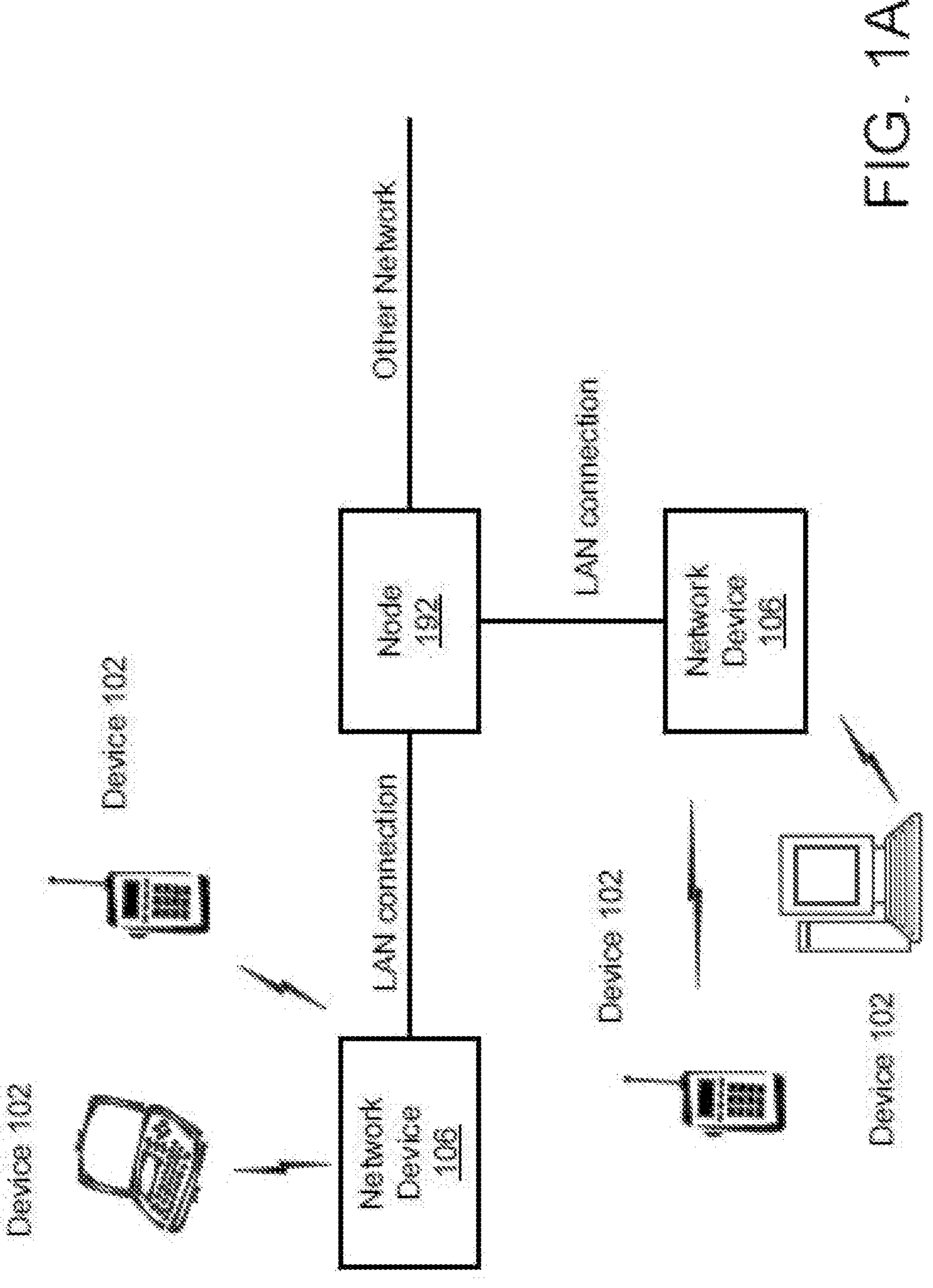
FIG. 1A is a block diagram depicting a network environment including one or more access points in communication with one or more devices or stations, according to some embodiments.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: WiFi Alliance standards and IEEE 802.11 standards including but not limited to IEEE 802.11a™, IEEE 802.11b™, IEEE 802.11g™, IEEE 802.11be™, IEEE P802.11n™; and IEEE P802.11ac™ standards. Although this disclosure can reference aspects of these standard(s), the disclosure is in no way limited by these standard(s).

For purposes of reading the description of the various embodiments below, the following descriptions of the sections of the specification and their respective contents can be helpful:

Section A describes a network environment and computing environment which can be useful for practicing embodiments described herein; and Section B describes embodiments of secure pause resume operations protocols (e.g., secure power saving protocols) and methods and devices using such protocols.

Various embodiments disclosed herein are related to a protocol for dual link or multilink operations on a network or for a point to point connections. In some embodiments, a protocol is provided for multilink communications using a connection. The protocol can be a data management multilink (DMML) protocol. In some embodiments, a DMML operation may refer to an operation performed according to a protocol where discovery or authentication and association operations are performed in a first band and data transfers are performed on the first band or the second band. A phrase DMML capable device refers to any device that can perform and operation according to the DMML protocol.

The connection can be a wireless connection to or from a client device (e.g., a STA) or AP or can be between other types of communication devices. The wireless network can be an 802.11 WiFi network (e.g., IEEE 802.11be) in some embodiments. The client device or AP can be implemented in a device including one or more integrated circuits (ICs) packaged in an IC package.

In some embodiments, systems and methods provide more efficient use of bandwidth in dual or multi-band WiFi networks, such as, 802.11be networks. In some embodiments, the systems and methods provide segregated WiFi multi-link operations where a WiFi device (e.g., client device or AP) is capable of supporting another WiFi band other than the 2G band. The management and/or control path are provided via a robust, long range link such as the 2G WiFi link which may be slower and the data path is provided on a wider, less congested link, such as a WiFi band above the 2G band in some embodiments. The less congested link is used for a heavy data traffic as much as feasible in some embodiments. For example, the less congested band can be a 5G, 6G or 60G WiFi band apart from the 2.4 GHZ (2G) band which is used for management and/or control path in some embodiments.

In some embodiments, dual or multi-band WiFi devices (APs and clients devices) are configured for more efficient dual or multiband operations. In some embodiments, the systems and methods reduce roaming between bands and do not require that the network administrator configure each band of a single AP as a separate basic service set (BSS). In some embodiments, the systems and methods reduce discovery operations (e.g., discovering the AP using scanning for beacon signals or probe requests) in the 6G and/or 60G band which can be time consuming. Discovery operations refer to the communication of frames for discovering the availability and/or identification of an AP or other wireless device in some embodiments. Discovery operations may involve the communication of probe frames and probe response frames. For example, even though the 6G band operation intends to avoid unnecessary management frame transmissions for discovery purposes (e.g., sending broadcast probe requests), certain protocols can burden the medium by transmitting slow speed (unsolicited probe response (UPR)/fast initial link setup (FILS)) frames every 20 milliseconds (ms) from the AP. In some embodiments, systems and methods avoid the impact on high throughput due to the sheer variation between 2G and other wide bands. In some embodiments, systems and methods handle security more efficiently by avoiding the provision of slow speed broadcast/multicast packets on each of the supported bands related to operations where the client device may come and associated in any of the bands. In some embodiments, the systems and methods avoid an adverse impact on throughput of proposed simultaneous transmitting and receiving/enhanced multilink single radio (STR/eMLSR) multilink operation in WiFi 7.

In certain networks, the number of WiFi management frames communicated on the medium is high especially when there are a larger number of client devices. APs are generally transmitting beacons frames at regular interval, and the AP is responding to unknown client devices with its probe response frames which most of the time end up not reaching the destination as the client device might have moved out of the channel for subsequent discovery or roaming. This low speed management traffic indirectly affects the speed of the traffic (both management traffic and non-management data traffic). Each management frame transmission implies a missed data transmission opportunity for a node in the network. In some embodiments, the systems and methods segregate the management traffic from the data traffic to improve the data efficiency associated with the low speed management traffic. In some embodiments, the 2G band is used for more robust and longer range low speed management traffic communications. In some embodiments, the systems and methods use a protocol where low power WiFi internet of things (IoT) devices use the 2G band as power efficiency is better on the 2G band than on the other high frequency bands. In some embodiments, the systems and methods use the 2G band for data transmissions at longer ranges rather than higher frequency bands.

Some embodiments relate to a device includes a circuit configured to provide at least one frame while a connection is being established. The frame including data indicating that the device is capable of a data management multilink (DMML) operation.

In some embodiments, the frame is provided according to an 802.11 protocol and the connection is established by using an association or authentication operation. In some embodiments, the DMML operation includes transferring data on a first channel in a first band and resuming data communication on a second channel in second band after performing an authorization operation on the second channel and an association operation on a third channel in a third band. In some embodiments, the frame is a control frame.

In some embodiments, association operations are only performed in the first band when using a DMML operation. In some embodiments, when using the DMML operation, data frames are transmitted in either the first band or the second band. In some embodiments, power management frames are only communicated in the second band.

In some embodiments, the second band is a 2G band and the first band is one of a 5G band, a 6G band or a 60G band. In some embodiments, the device comprises a station or an access point. In some embodiments, the circuit is configured to disable DMML operation in response to a low battery mode.

Some embodiments relate to a device including a circuit configured to use a discovery operation and an association operation on a first channel in a first band and use a first data operation on a second channel in second band after performing an authorization operation on the first channel. The circuit is configured to use a second data operation on a third channel in a third band if interference is detected in the second channel.

In some embodiments, the circuit is configured to use a third data operation on the first channel if a range between the device and an AP is greater than a threshold when the second data operation is used. In some embodiments, the circuit is further configured to use a third channel in the second band after performing an authorization operation on the third channel and an association operation on the first channel in the first band.

In some embodiments, the circuit is configured to provide at least one frame while a connection is being established. The frame includes data indicating that the device is capable of a data management multilink (DMML) operation. In some embodiments, the device includes a station or an access point.

Some embodiments relate to a method providing an indication of whether the first device is a data management multilink (DMML) capable device while a connection is being established between a first device and a second device. The connection is established using a first channel in a first band. The method also includes transferring data on a second channel in a second band according to a DMML operation and performing power management communications on the first channel in the first band according to the DMML operation.

In some embodiments, the power management communications are provided according to an 802.11 protocol. In some embodiments, the method further includes transferring data on a third channel in third band if interference is detected in the second channel according to the DMML operation. In some embodiments, the data is transferred in the third channel after an association operation on the first channel in the first band. The association operation is performed after the data is transferred on the second channel. In some embodiments, the method further includes performing security communications on the first channel in the first band according to the DMML operation.

An access point to station (STA or client device) association or authentication operation may refer to an association operation, an authentication operation, or combination thereof involving a STA and an AP in some embodiments. A field may refer to a portion of a data construct (e.g., a frame) for data having a particular meaning in some embodiments.

A connection may refer to communication instituted between nodes (such as a wireless communication between nodes) for exchanging data according to a protocol in some embodiments. The phrase while a connection is being established may refer to a time period when a connection is being instituted in some embodiments. The time period may include the time when control frames such as those associated with discovery, authentication and/or association are being exchanged in some embodiments. In some embodiments, a connection is established using the three-way or four-way handshake mechanism in some embodiments. A secure connection may refer to a connection that provides data in a format that cannot easily be obtained by another party in some embodiments. Various methods can establish a secure connection including but not limited to a data encryption method. In some embodiments, data encryption employs algorithms that encrypt and decrypt the information, including but not limited to: WPA and WPA2 operations under the 802.11 standard (e.g., temporal key integrity protocol (TKIP) and advanced encryption standard (AES).

A channel may refer to any portion of the electromagnetic spectrum used to communicate data. The portions can have various bandwidths and can be combined to form wider bandwidths or channels. Channels can have 5 MHz spacing about a center frequency and can occupy a band of at least 20 MHz in some embodiments. A primary control channel may refer to a channel in a bandwidth of a larger channel (e.g., wider bandwidth) that includes a secondary bandwidth channel or secondary channel in some embodiments. In some embodiments, the primary control channel uses an upper half or lower half of the bandwidth of the wider channel, and the secondary channel uses the remaining half of the bandwidth of the wider channel. In some embodiments, the bandwidths of the primary bandwidth channel and the secondary bandwidth channel are not equal, and the primary control channel occupies a sub band and one or more secondary channels occupy the remaining sub bands in the wider bandwidth. In some embodiments, the secondary channel has more or less bandwidth than the primary control channel. In some embodiments, the primary control channel is used for client devices that only support a smaller channel bandwidth (e.g., 20 MHZ) while the primary control channel and the secondary channel(s) can be used for client devices that support wider channel capabilities. In some embodiments, there are multiple secondary bandwidth channels and a single primary bandwidth channel, each having the same bandwidth. The terms primary and secondary do not connote a specific priority and can be interchanged with first and second and vice versa in some embodiments. In some embodiments, the channels are in the 2G, 5G, 6G or 60 G bands.

In some embodiments, the primary control channel is a common channel of operation for all stations (STAs) that are members of the basic service set (BSS). For example, in a 20 MHz, 40 MHZ, 80 MHZ, 160 MHz or 80+80 MHz, 320 MHz bandwidth BSS, the primary control channel is a 20 MHz channel. The primary control channel is used for transmitting all the management frames. A primary control channel may refer to any channel used to send and receive management frames including but not limited to beacon frames, probe request/response frames, authentication request/response frames, association request/response frames, deauthentication frames, disassociation frames, etc.

Authentication and association under 802.11 standards provides a method for supplying different levels of access to client devices in a network. Connection between an AP and a STA must generally be authenticated and associated with an AP before data packets can be exchanged using the connection. Wireless networks can employ a power save protocol (PSP) where client stations enter a sleep mode, during which the client stations are unable to transmit or receive data on a home channel in order to conserve energy or to perform other operations (e.g., operations on other channel). Per PSP, the client can enter sleep mode after connection (after authentication and association).

An authentication operation may refer to a procedure for how a client device gains access to the network in some embodiments. Authentication provides proof of identity to ensure the client is allowed access to the network in some embodiments. An association operation may refer to a procedure for a client device that has been authenticated to become associated with an AP in some embodiments. Association allows the network to determine where to send data that is intended for a client device (e.g., data is sent through the AP with which the client device is associated) in some embodiments. Generally, a client device is only associated with a single AP in some embodiments.

A sleep mode may refer to a mode of operation where a device communicating on a network reduces its communication (e.g., to save power) in some embodiments. In some embodiments, a sleep mode may involve the device being in a mode where it does not receive or transmit data for a time period or until further notice in an existing channel. For example, a STA may be considered in a sleep mode because it is not communicating on a first channel (e.g., a home channel) even though it is using power to communicate on another channel or performing a channel scanning operation on other channels in some embodiments.

A frame may refer to a digital data transmission unit in some embodiments. For example, a frame may refer to a container for a single network packet. A data frame may refer to a frame that contains data in some embodiments. An encrypted frame may refer to a frame that has been encrypted in some embodiments.

A. Computing and Network Environment

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) or network devices 106, one or more client devices (e.g., STAs) or wireless communication devices 102 and a network hardware component or network hardware 192. The wireless communication devices 102 can for example include laptop computers, tablets, personal computers, and/or cellular telephone devices. The details of an embodiment of each station or wireless communication device 102 and AP or network device 106 are described in greater detail with reference to FIGS. 1B and 1C. The network environment can be an ad hoc network environment, an infrastructure wireless network environment, a subnet environment, etc. in one embodiment. The network devices 106 or APs can be operably coupled to the network hardware 192 via local area network connections. Network devices 106 are 5G base stations in some embodiments. The network hardware 192, which can include a router, gateway, switch, bridge, modem, system controller, appliance, etc., can provide a local area network connection for the communication system. Each of the network devices 106 or APs can have an associated antenna or an antenna array to communicate with the wireless communication devices in its area. The wireless communication devices 102 can register with a particular network device 106 or AP to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to network device 106 or AP.

In some embodiments, a network device 106 or AP includes a device or module (including a combination of hardware and software) that allows wireless communication devices 102 to connect to a wired network using wireless-fidelity (WiFi), or other standards. A network device 106 or AP can sometimes be referred to as a wireless access point (WAP). A network device 106 or AP can be implemented (e.g., configured, designed and/or built) for operating in a wireless local area network (WLAN). A network device 106 or AP can connect to a router (e.g., via a wired network) as a standalone device in some embodiments. In other embodiments, network device 106 or AP can be a component of a router. Network device 106 or AP can provide multiple devices access to a network. Network device 106 or AP can, for example, connect to a wired Ethernet connection and provide wireless connections using radio frequency links for other devices 102 to utilize that wired connection. A network device 106 or AP can be implemented to support a standard for sending and receiving data using one or more radio frequencies. Those standards, and the frequencies they use can be defined by the IEEE (e.g., IEEE 802.11 standards). A network device 106 or AP can be configured and/or used to support public Internet hotspots, and/or on a network to extend the network's Wi-Fi signal range.

In some embodiments, the access points or network devices 106 can be used for (e.g., in-home, in-vehicle, or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points or network devices 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more access points or network devices 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
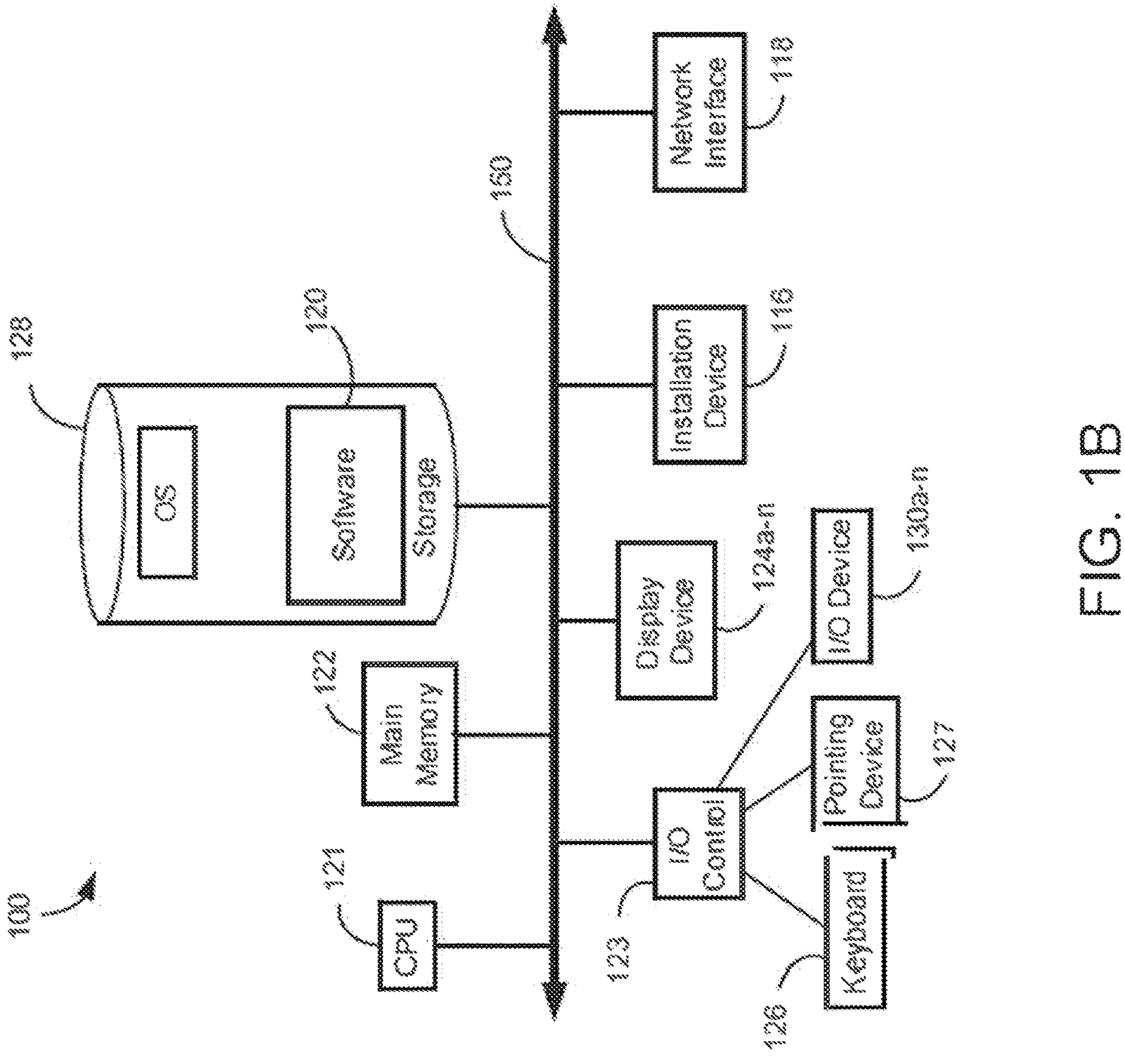
FIGS. 1B and 1C are block diagrams depicting computing devices useful in connection with the methods and systems described herein, according to some embodiments.
Figure 1C:
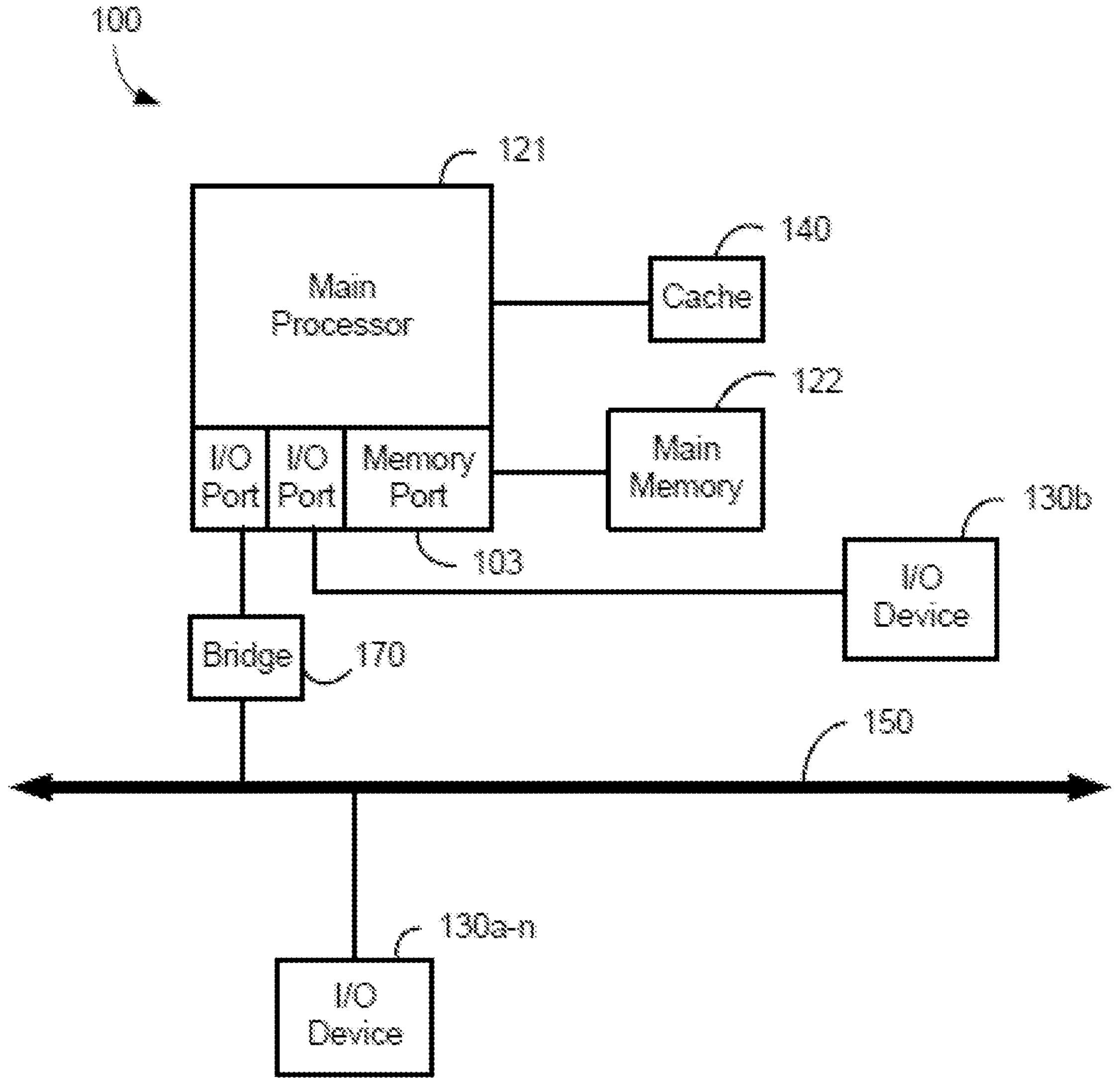

The communications device(s) 102 and access point(s) or network devices 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or network device 106. As shown in FIGS. 1B and 1C, each computing device 100 includes a processor 121 (e.g., central processing unit), and a main memory unit 122. As shown in FIG. 1B, a computing device 100 can include a storage device 128, an installation device 116, a network interface 118, an I/O controller 123, display devices 124*a*-124*n*, a keyboard 126 and a pointing device 127, such as a mouse. The storage device 128 can include an operating system and/or software. As shown in FIG. 1C, each computing device 100 can also include additional optional elements, such as a memory port 103, a bridge 170, one or more input/output devices 130*a*-130*n*, and a cache memory 140 in communication with the central processing unit or processor 121.

The central processing unit or processor 121 is any logic circuitry that responds to and processes instructions fetched from the main memory unit 122. In many embodiments, the central processing unit or processor 121 is provided by a microprocessor unit, such as: those manufactured by Intel Corporation of Santa Clara, California; those manufactured by International Business Machines of White Plains, New York; or those manufactured by Advanced Micro Devices of Sunnyvale, California. The computing device 100 can be based on any of these processors, or any other processor capable of operating as described herein.

Main memory unit 122 can be one or more memory chips capable of storing data and allowing any storage location to be directly accessed by the microprocessor or processor 121, such as any type or variant of Static random access memory (SRAM), Dynamic random access memory (DRAM), Ferroelectric RAM (FRAM), NAND Flash, NOR Flash and Solid State Drives (SSD). The main memory unit 122 can be based on any of the above described memory chips, or any other available memory chips capable of operating as described herein. In the embodiment shown in FIG. 1B, the processor 121 communicates with main memory unit 122 via a system bus 150 (described in more detail below). FIG. 1C depicts an embodiment of a computing device 100 in which the processor communicates directly with main memory unit 122 via a memory port 103. For example, in FIG. 1C the main memory unit 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory unit 122 and is provided by, for example, SRAM, BSRAM, or EDRAM. In the embodiment shown in FIG. 1C, the processor 121 communicates with various I/O devices 130 via a local system bus (e.g., system bus 150). Various buses can be used to connect the central processing unit or processor 121 to any of the I/O devices 130, for example, a VESA VL bus, an ISA bus, an EISA bus, a Micro Channel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer or computer system 100 in which the main processor 121 can communicate directly with I/O device 130*b*, for example via HYPERTRANSPORT, RAPIDIO, or INFINIBAND communications technology. FIG. 1C also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* can be present in the computing device 100. Input devices include keyboards, mice, track pads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium for the computing device 100. In still other embodiments, the computing device 100 can provide USB connections (not shown) to receive handheld USB storage devices such as the USB Flash Drive line of devices manufactured by Twintech Industry, Inc. of Los Alamitos, California.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124*a*-124*n*. As such, any of the I/O devices 130*a*-130*n* and/or the I/O controller 123 can include any type and/or form of suitable hardware, software, or combination of hardware and software to support, enable or provide for the connection and use of the display device(s) 124*a*-124*n* by the computing device 100. For example, the computing device 100 can include any type and/or form of video adapter, video card, driver, and/or library to interface, communicate, connect or otherwise use the display device(s) 124*a*-124*n*. In one embodiment, a video adapter can include multiple connectors to interface to the display device(s) 124*a*-124*n*. In other embodiments, the computing device 100 can include multiple video adapters, with each video adapter connected to the display device(s) 124*a*-124*n*. In some embodiments, any portion of the operating system of the computing device 100 can be configured for using multiple display devices 124*a*-124*n*. In further embodiments, an I/O device 130 can be a bridge between the system bus 150 and an external communication bus, such as a USB bus, an Apple Desktop Bus, an RS-232 serial connection, a SCSI bus, a Fire Wire bus, a FireWire 800 bus, an Ethernet bus, an AppleTalk bus, a Gigabit Ethernet bus, an Asynchronous Transfer Mode bus, a Fibre Channel bus, a fiber optic bus, a Serial Attached small computer system interface bus, a USB connection, or a HDMI bus.

A computing device 100 of the sort depicted in FIGS. 1B and 1C can operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8 and 10, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system or computing device 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Client Device and AP Communication

Disclosed herein are systems and methods that can be used in any communication system including but not limited to Wi-Fi networks. The systems and methods can be used with an AP or STA in a communication network such as the devices discussed with reference to FIGS. 1A-C. Although embodiments of a multilink communications under the IEEE 802.11 standard are described herein, the systems and methods can be used with other networks (cellular networks) and in point to point communications.

Figure 2A:
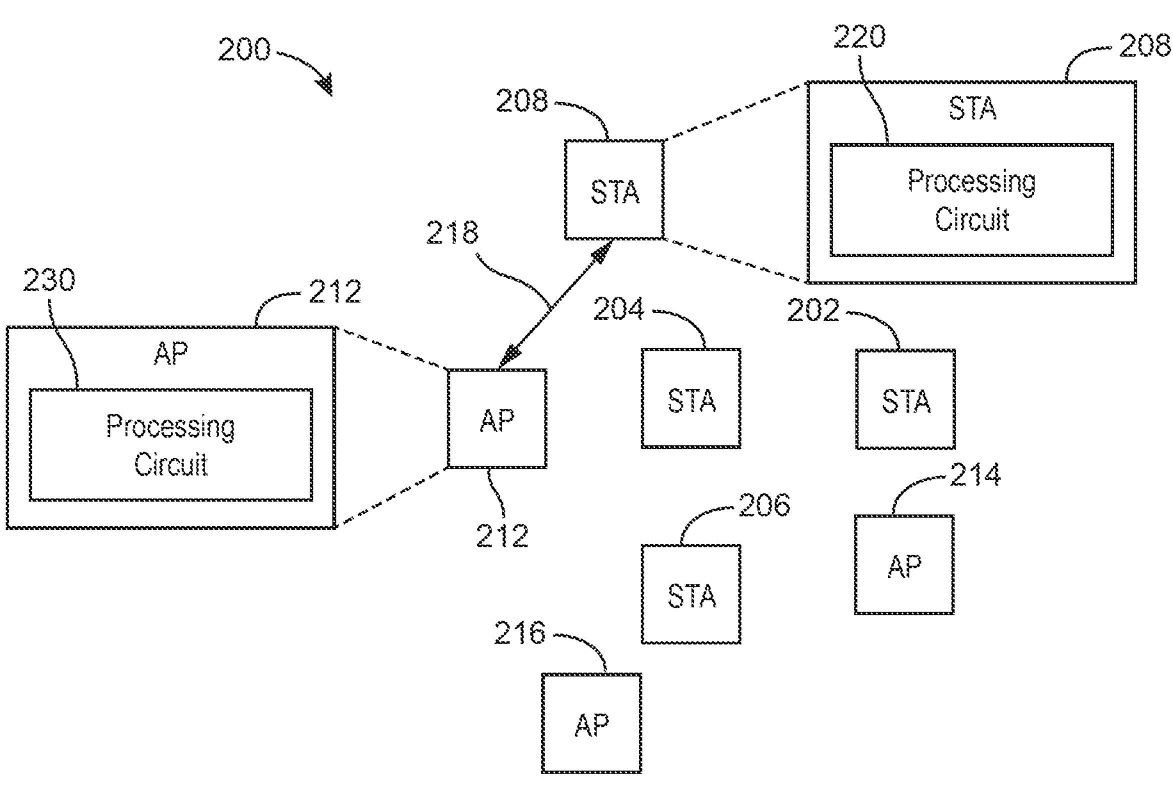
FIG. 2A is a block diagram depicting a network including access points (APs) and stations (STAs), according to some embodiments.

With reference to FIG. 2A, a wireless communication network or system 200 includes client devices or STAs 202, 204, 206, and 208 and APs 212, 214, and 216. STAs 202, 204, 206, and 208 and APs 212, 214, and 216 can be used in the systems discussed with reference to FIGS. 1A-C. Any number of STAs 202, 204, 206, and 208 and APs 212, 214, and 216 can be used in the network or system 200. A STA or client device may refer any device for communicating in communication system and includes but is not limited to a fixed, portable, or mobile laptop, desktop personal computer, personal digital assistant, work station, wearable device, smart phone, or Wi-Fi phone in some embodiments. An access point or AP may refer to a device for communicatively coupling one or more non-AP devices (e.g., a client device or STA) to a network in some embodiments. An AP may enable non-AP devices to connect and communicate with a network in some embodiments. In some embodiments, an AP is a wireless access point (WAP) configured to enable wireless communication between non-AP devices. An AP includes but is not limited to a mobile, portable, or fixed hot spot, router, bridge, or other communication device. An AP can provide services to a STA, such as serving as a connection point to another network.

STAs 202, 204, 206, and 208 and APs 212, 214, and 216 can each include a wireless transceiver and a various modules for communicating via connections. The modules can be software (e.g., firmware), hardware components, and combinations thereof. In some embodiments, each of STAs 202, 204, and 206 and APs 212, 214, and 216 includes an IEEE 802.11 conformant media access control (MAC) layer circuit and physical (PHY) layer interface to the wireless medium and can be part of a larger device or system. In some embodiments, each of STAs 202, 204, 206, and 208 and APs 212, 214, and 216 operates according to other standards than the IEEE 802.11 standard.

A connection for wireless communication can be established between at least one of STAs 202, 204, 206, and 208 and APs 212, 214, and 216 after authentication and association. For example, STA 208 has a connection 218 to AP 212. STAs 202, 204, 206, and 208 each include circuitry (e.g., a processor or processing circuit 230), and APs 212, 214, and 216 each include circuitry (e.g., a processing circuit 231) for establishing and cancelling the connection 218 and communicating data across the connection and operating according to multilink or dual link operations. The connection 218 is a wireless connection formed using an association and/or authorization operation and cancelled using a disassociation and/or deauthentication operation in some embodiments. The connection 218 can be multilink or dual link connection associated with AP 212 and can be a secure connection (e.g., using encryption) in some embodiments. In some embodiments, the connection 218 provides data communications on one or more channels in a 5G, 6G or 60G band and control and management communications in a 2G band. A dual link or multilink connection may refer to a connection that communicates data across more than one channel (e.g., in two or more bands) in some embodiments.

Figure 2B:
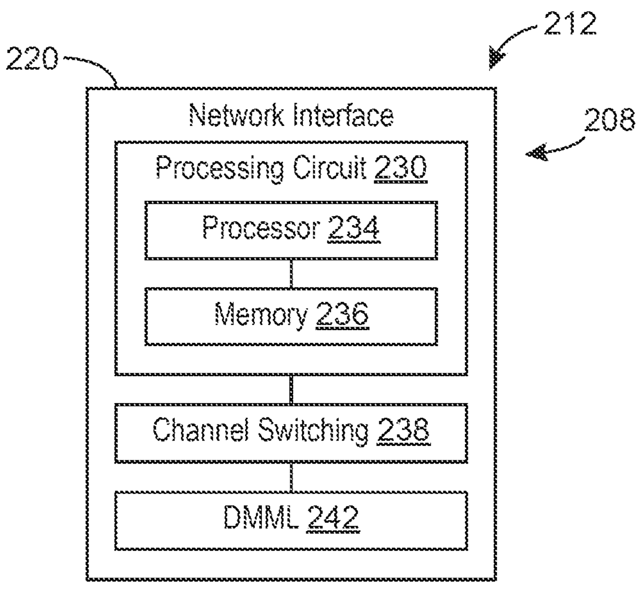
FIG. 2B is a more detailed block diagram of an AP or STA configured for multilink operations according to some embodiments.

Referring to FIG. 2B, a device 220 is an AP 212 or STA 208 (FIG. 2A) and is configured for DMML operations according to some embodiments. In some embodiments, device 220 includes a processing circuit 232, a channel switching module 238, and a DMML module 242. The processing circuit 232 is any circuitry or components that can perform logic and communication processing operations and can include a processor 234 and a memory 236 in some embodiments.

In some embodiments, the processing circuit 232 is implemented as a field-programmable gate array, an application-specific integrated circuit, hardware, a software executing processor, or state machines. In some embodiments, the processing circuit 232 is part of layers (e.g., MAC, network, PHY layers) of IEEE 802.11 standard devices. The processing circuit 232 can be configured to perform communication operations, frame building and processing, discovery operations, association operations, authorization operations, connection setup, disassociation operations, DMML operations, and deauthentication operations in some embodiments. Instructions for the processing circuit 232 are stored in a non-transitory medium such as memory 236 in some embodiments. Processing circuit 230 of STA 208 and processing circuit 231 of AP 212 are similar to processing circuit 232 in some embodiments.

The memory 236 may be one or more devices (e.g., RAM, ROM, Flash memory, hard disk storage) for storing data and/or computer code for completing and/or facilitating the various processes described herein. The memory 236 may be or include non-transient volatile memory, non-volatile memory, and non-transitory computer storage media. Memory 236 may include database components, object code components, script components, or any other type of information structure for supporting the various activities and information structures described herein. Memory 236 may be communicably coupled to the processor 234 and include computer code or instructions for executing one or more processes described herein. The processor 234 may be implemented as one or more application specific integrated circuits (ASICs), field programmable gate arrays (FPGAs), a group of processing components, a software executing processor, state machines or other suitable electronic processing components. As such, AP or network device 106 (FIG. 1A) is configured to execute a variety of modules and/or programs and store associated data in a database of the memory 236. The modules (e.g., modules 238 and 242) can be implemented in AP software (e.g., MAC layer or PHY layer software) or STA software (e.g., MAC layer or PHY layer software). In some embodiments, the AP 212 or STA 208 (FIG. 2A) is structured and used to establish connections with other computing systems and devices (e.g., wireless communication device(s) 102, network hardware 192, other access points or network devices 106, (FIGS. 1A-C) via a network (e.g., WAN connection, LAN connection, WLAN connection, etc.).

In some embodiments, processing circuit 232 includes a channel switching module 238. The channel switching module 238 can be configured to communicatively coupling with one or more client devices (e.g., non-AP devices 102 or STAs 202, 204, 206, and 208 (FIG. 2A)) and can be configured to allocate the one or more devices 102 on one or more channels (e.g., a data channel in a 2G, 5G, 6G or 60G band and control and management channel in a 2G band). In particular, the channel switching module 238 can be configured to perform the dynamic sub band operations and/or scan operations. For example, the channel switching module 238 can be configured to determine a network traffic of the devices 102. Accordingly, the channel switching module 238 may utilize a channel switching protocol to improve network traffic (e.g., uplink traffic and downlink traffic) from the AP 212 to the device(s) 102 using DMML operations. Device(s) 102 may be split between different parts of the 320 MHz spectrum, on different channels. The channel switch protocol includes moving between primary and secondary channels. In particular, channel switching module 238 enable an AP 212 to dynamically switch devices 102 between channels based on, for example actual network traffic and/or expected network traffic. For example, the channel switching module 238 can be configured to switch the device 102 (FIG. 1) (or AP 212 or STA 208) from a primary bandwidth channel or home channel to operate on a secondary bandwidth channel. In particular, the channel switching module 238 can determine if a device 102 or AP 212 should switch channels based on (i) a bandwidth availability and (ii) a quality of service requirement. Module 238 can be any circuit or circuitry (with or without software) configured to designate one or more devices to communicate on a channel or portion of a channel (including but not limited to a primary control channel). Module 238 can be used to perform a scanning operation and return to a home channel in some embodiments.

In some embodiments, the DMML module 242 is configured to implement a DMML protocol. In some embodiments, the module 242 causes device 220 to receive or provide management frames on a lower frequency channel (e.g. a channel in the 2G band) and causes device 220 to receive or provide data frames in higher frequency channel (e.g. a channel in the 5G, 6G, or 60G band). The module 242 causes device 220 to receive or provide data frames on a lower frequency channel (e.g. a channel in the 2G band) when a distance between devices is above a threshold or when channel quality in the higher frequency channels is lower than a threshold in some embodiments. In some embodiments, the thresholds are at level where the communication is less efficient at the higher frequency channels (e.g., less efficient than at the lower frequency channels). In some embodiments, the thresholds can be based upon signal quality (e.g., signal to noise ratio, number of dropped packets, signal strength (root mean squared signal strength indicator (RSSI), error correction parameters, etc.).

In some embodiments, device 220 is a DMML capable AP that is configured to broadcast beacon frames or signals only on the configured 2G channel. Device 220 is also configured to address all the legacy (e.g., non-DMML capable) client devices only through the 2G band because a legacy client device that supports a band other than the 2G band cannot discover and connect to the DMML capable AP on a band outside of the 2G band under the DMML protocol. In some embodiments, the DMML protocol has DMML capable client devices perform discovery on the 2G channels (e.g. limited only to discovery on 2G channels similar to any legacy 2G client devices), and permits active and passive scanning in all the regulatory channels without dynamic frequency selection (DFS) considerations. In some embodiments, the DMML module 242 provides a probe response from device 220 configured as an AP. The probe response includes a multilink control field (e.g., a 1 bit field) that allows a DMML capable client device to determine whether device 220 is capable of supporting DMML operations. The DMML capable client device can use the link profile to determine channel, bandwidth, duration of packet extension (TPE), etc. on supported wider bandwidth channels. In some embodiments, the DMML capable client device may give preference over standalone 2G, 5G, 6G, or 60G band APs due its advantage of less overhead. After connection, as the 2G slice is often idle for most of the time, the DMML capable client device periodically updates the roam cache using the 2G channel in some embodiments.

In some embodiments, connection 218 is provided on 2G link or channel using authentication and association frame exchanges on the 2G link. If the authentication is simultaneous authentication of equals (SAE), the generated pairwise master key (PMK) is preserved for both the slices. The 4-way handshake occurs only on the 2G link while the generated unicast key is plumbed on both the links in some embodiments. The DMML capable client device receives broadcast and multicast (BCMC) packets only on the 2G link according to the protocol in some embodiments and the group temporal key (GTK) is plumbed only on the 2G slice. The DMML capable AP broadcasts the BCMC packets after transmitting DTIM-0 beacons only on the 2G Band as if the DMML capable AP is a legacy 2G band AP according to the protocol in some embodiments.

In some embodiments, the DMML module 242 provides block acknowledge (ACK) establishment through the 2G link, according to the protocol in some embodiments but the negotiated values are applicable for both the links. In default mode, the data traffic occurs only on the active wider band data link using the 2G link established block acknowledgment (BA) session as long as the range permits. In some embodiments, if the data traffic on the 6G link fails, the DMML module 242 continues the same BA session using the 2G link. If a multilink (ML) data path (e.g., enhanced multilink single radio (eMLSR) operation is used, the data traffic can be maintained in multiple wider bands as long as the link capability among the multi-links are same but better than the link capability of the 2G link according to the protocol in some embodiments.

In some embodiments, the DMML module 242 can selectively disable/suspend the data link on each wider band if the device is going to repurpose the band for other services or other power save reasons according to the protocol in some embodiments. For example, when a DMML capable device has 5G and 6G separate slices, the DMML module 242 can use only the 6G slice as a data link and use the 5G link for establishing connections for another interface. In another example, when a DMML capable device has the same slice for 5G/6G bands, but when the 6G band standalone is better than the 5G band in terms of performance, the DMML module 242 disables the 5G band to avoid switching between the bands. In yet another example, when a DMML capable device is operating in low battery mode, the DMML module 242 can disable the DMML altogether and retain only the 2G link for data traffic. A low battery mode may refer to a mode where a level of power available to a device is low (e.g., less than 10 percent of battery power) in some embodiments.

In some embodiments, the protocol can adjust for situations where DMML capable devices are not running data heavy applications like streaming, file download, etc. in some embodiments. In a default mode, the DMML module 242 enables DMML operation in the DMML capable clients for all the traffic identifiers (TIDs) in some embodiments. If a user wants to enable DMML operation only for specific priority links, DMML module 242 enable DMML operation in the DMML capable clients using link identification (LinkID) to TID mapping by disabling DMML operations for all other TIDs according to the protocol in some embodiments. The user may select the specific links (e.g., LinkIDs). When the DMML is not enabled for any of the TID, the 6G slice is put into sleep mode in some embodiments. As the TID to LinkID mapping is communicated to the DMML capable AP, the DMML capable AP does not use the 6G link for further data transfer according to the protocol in some embodiments.

In some embodiments, the DMML capable device handles power management (PM) through the 2G link according to the protocol in some embodiments. Power management communications may refer to communications used to perform PM operations in some embodiments. For example, PM operations, such as the null frame exchange providing the PM bit, happens only over the 2G link in some embodiments. When the DMML capable device is in an idle state, the DMML capable device is in the PM state (e.g., similar to legacy 2G devices) in some embodiments. The wider band slice meant for data traffic is in hibernate mode and the 2G slice or other equivalent lower power slice capable of receiving legacy beacons is used for periodic waking ups for beacon reception and BCMC data reception according to the protocol in some embodiments. Once the DMML capable device determines the data availability at the AP via the TIM field, the DMML capable device sends the NULL frame or other equivalent frame to the AP to inform the AP of the awake state of the DMML capable device and simultaneously wakes up the wider band data link for data reception according to the protocol in some embodiments. When the DMML capable device is waking up on its own, DMML capable device may transmit the data via the wider band data link with the PM bit set as 0. The DMML capable AP is able to receive the data packets from the client device on the negotiated data link any time in some embodiments.

In some embodiments, the DMML module 242 of the DMML capable device handles data rate adaption. When the range is not suitable for the wider band data traffic for any given link, the rate adaption mechanism uses the 2G Link and returns to the wider band data link once the environment is suitable for high data traffic. The exemplary table below shows the supported data rates by band according to some embodiments. If multiple wider bands are supported (e.g., in 5G and 6G bands), the data traffic can be sent via both the bands as long as the link capabilities of the wider bands are similar in some embodiments. The broadcast/multicast packets are always transmitted in the 2G link only according to the protocol in some embodiments. Rate adaption can start from the lowest wider band data rate (not underlined values in the below table) in some embodiments. Upon failure, the DMML capable device can move back to the 2G link rate (shown as underlined) in some embodiments.

Upon success, the DMML capable device can move up the ladder only in the wider band data link rates in some embodiments.

TABLE

Supported Data Rates

| MCS | 20 MHz | 40 MHz | 80 MHz | 160 MHz |
|---|---|---|---|---|
| 0 | 16.25 17.21 | 32.50 34.41 | 68.06 72.06 | 136.11 144.12 |
| 1 | 32.50 34.41 | 65.00 68.82 | 136.11 144.12 | 272.22 288.24 |
| 2 | 48.75 51.62 | 97.50 103.24 | 204.17 216.18 | 408.33 432.35 |
| 3 | 65.00 68.82 | 130.00 137.65 | 272.22 288.24 | 544.44 576.47 |
| 4 | 97.50 103.24 | 195.00 206.47 | 408.33 432.35 | 816.67 864.71 |
| 5 | 130.00 137.65 | 260.00 275.29 | 544.44 576.47 | 1088.89 1152.94 |
| 6 | 146.25 154.85 | 292.50 309.71 | 612.50 648.53 | 1225.00 1297.06 |
| 7 | 162.50 172.06 | 325.00 344.12 | 680.56 720.59 | 1361.11 1441.18 |
| 8 | 195.00 206.47 | 390.00 412.94 | 816.67 864.71 | 1633.33 1729.41 |
| 9 | 216.67 229.41 | 433.33 458.82 | 907.41 960.78 | 1814.81 1921.57 |
| 10 | 243.75 258.09 | 487.50 516.18 | 1020.83 1080.88 | 2041.67 2161.76 |
| 11 | 270.83 286.76 | 541.67 573.53 | 1134.26 1200.98 | 2268.52 2401.96 |
| 12 | 292.50 309.71 | 585.00 619.41 | 1225.00 1297.06 | 2450.00 2594.12 |
| 13 | 325.00 344.12 | 650.00 688.24 | 1361.11 1441.18 | 2722.22 2882.35 |

In some embodiments, the DMML module 242 of the DMML capable device manages roaming operations. The connection loss or beacon loss roaming is based on the 2G beacon loss in some embodiments. In some embodiments, the DMML module 242 of the DMML capable device performs opportunistic roaming (e.g., proactive roaming, opportunistic key catching (OPC) roaming) for better performance.

In some embodiments, the DMML module 242 of the DMML capable device keeps track of only the 2G channels for collecting the availability of the APs. As the data traffic is happening on the wider band channel, the 2G band is idle during the non-target beacon transmission time (TBTT) period, hence the TBTT period can be used for updating the roam cache according to the protocol in some embodiments. Once the existing wider band link capability goes below a threshold, a special authentication frame is provided to the available AP that has better 2G RSSI than the connected AP and a better quality of service enhanced BSS (QBSS) score on its wider band data channel in some embodiments. This special authentication frame is encoded at a better wider band data rate than the existing possible wider band data rate and sent on the wider band channel of the target channel in some embodiments. The special authentication frame is an authentication frame similar to an 802.11 authentication frame in some embodiments. The frame is sent over the wider band meant for data traffic at the modulation coding scheme (MCS) rate better than the current wider band data rate in some embodiments. If the frame is successfully delivered (e.g., receiving ACK) and the authentication frame from the AP is received at the same MCS rate, then the DMML capable client proceeds with the roam target via the 2G link, otherwise the DMML capable client aborts the roaming operation with the target AP in some embodiments. The DMML capable AP responds to the DMML capable client's authentication frame in the same wider band channel according to the protocol in some embodiments.

In some embodiments, the protocol allows for the wider band data channel used for the high speed link to be changed to the relatively less congested channel by the DMML capable AP or through the request from the DMML capable client. The DMML capable AP communicates the channel change to each of the clients using a suitable action frame transmitted on the 2G link. In this way, the DMML capable devices can switch the channel when the devices sense more medium activity by the overlapping or other BSS nearby and communicating in the wider band data channel.

Figure 3:
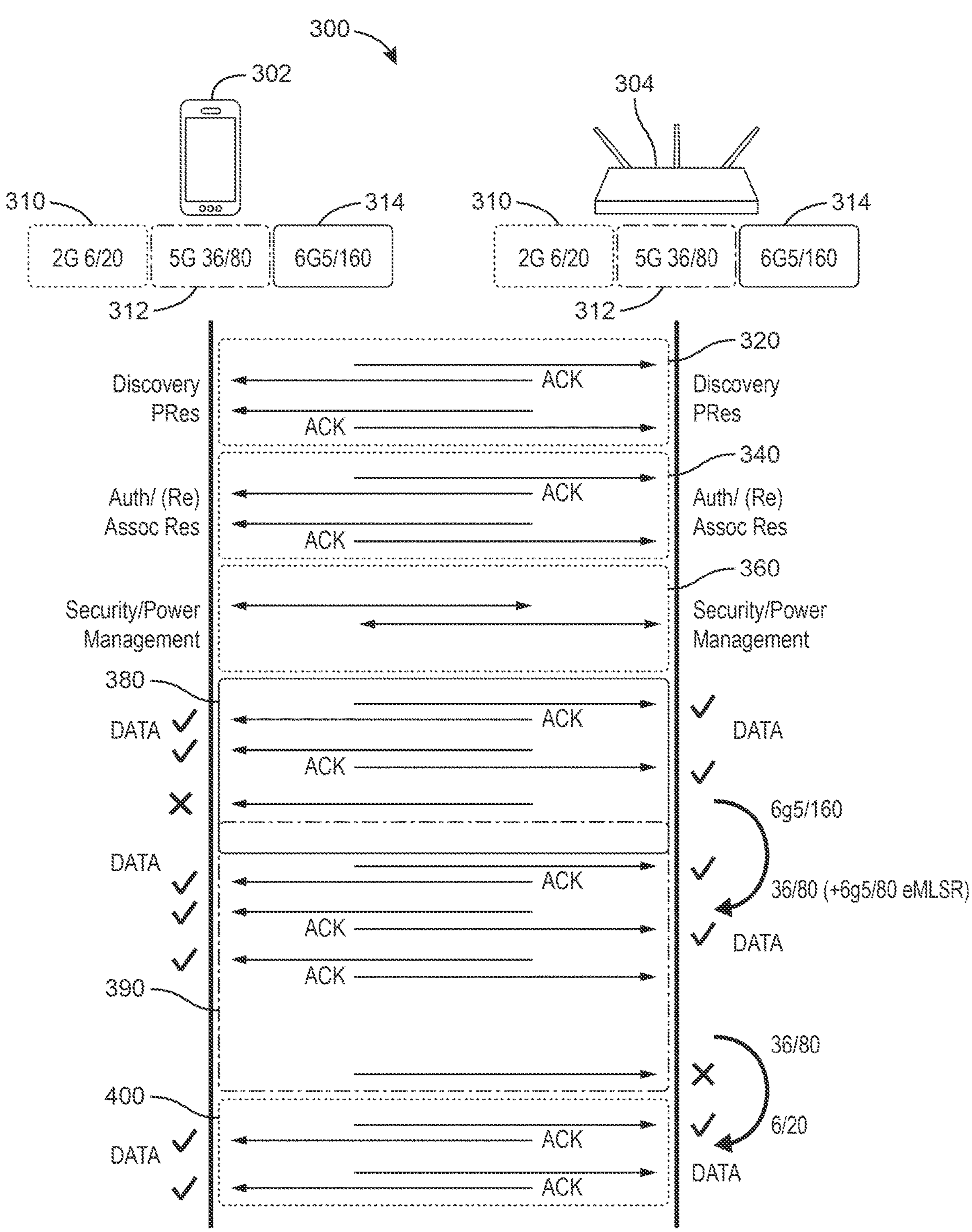
FIG. 3 is a timing diagram showing communication using multilink or dual link operations for the network illustrated in FIG. 2A according to some embodiments.

With reference to FIG. 3, a client device 302 is in communication with an AP 304. Client device 302 and AP 304 are DMML capable and communicate in the 2G, 5G and 6G bands. In some embodiments, client device 302 and 304 communicate on various channels including but limited to a channel 310 (channel 6, 20 MHz bandwidth, in the 2G band), a channel 312 (channel 36, 80 MHz bandwidth, in the 5G band), and a channel 314 (channel 5, 160 MHz bandwidth, in the 6G band). Client device 302 and AP 304 perform a discovery operation 320, an authorization and association operation 340, and a security and power management operation 360 on channel 310 in some embodiments. Discovery operation 320 involves communicating a probe request frame from client device 302 to AP 304 and communicating a probe response frame to client device 302 from AP 304. Acknowledge frames for the probe request frame and probe response frame can also be sent. Authorization and association operation 340 involves communicating an association frame and an authorization frame as well as acknowledge messages. Security and power management operation 360 involves sending security and/or power management frames in some embodiments. Power management frames can include data pause resume, a data on indication, a sleep mode indication, etc. Security frames may refer to communications (e.g., frames for key establishment) used to establish a secure connection in some embodiments.

Data frames are communicated using channel 314 between client device 302 and AP 304 in an operation 380. Acknowledge frames can also be provided on channel 314. If continuous interference occurs on channel 314, both the 5G and 6G band are activated. In an operation 390, the channel for data communication between client device 302 and AP 304 is switched from channel 314 and 312. The continuous interference can be on a portion of the bandwidth (e.g., upper 80 MHZ) in some embodiments. The selection of channels to switch to in the event of interference can be made at association, at initialization or before data transfers in some embodiments. In some embodiments, channel 5 with an 80 MHz bandwidth (e.g., lower bandwidth) and channel 314 can be used for the data transfer in operation 390 using an eMLSR.

Data frames are communicated using channel 314 between client device 302 and AP 304 in an operation 390. Acknowledge frames can also be provided on channel 314. If the distance increases between client device 302 and AP 304 (e.g., such that the range is not sustainable in the 5G or 6G band), the channel for data communication between client device 302 and AP 304 is switched from channel 312 and 310 in an operation 400.

Figure 4:
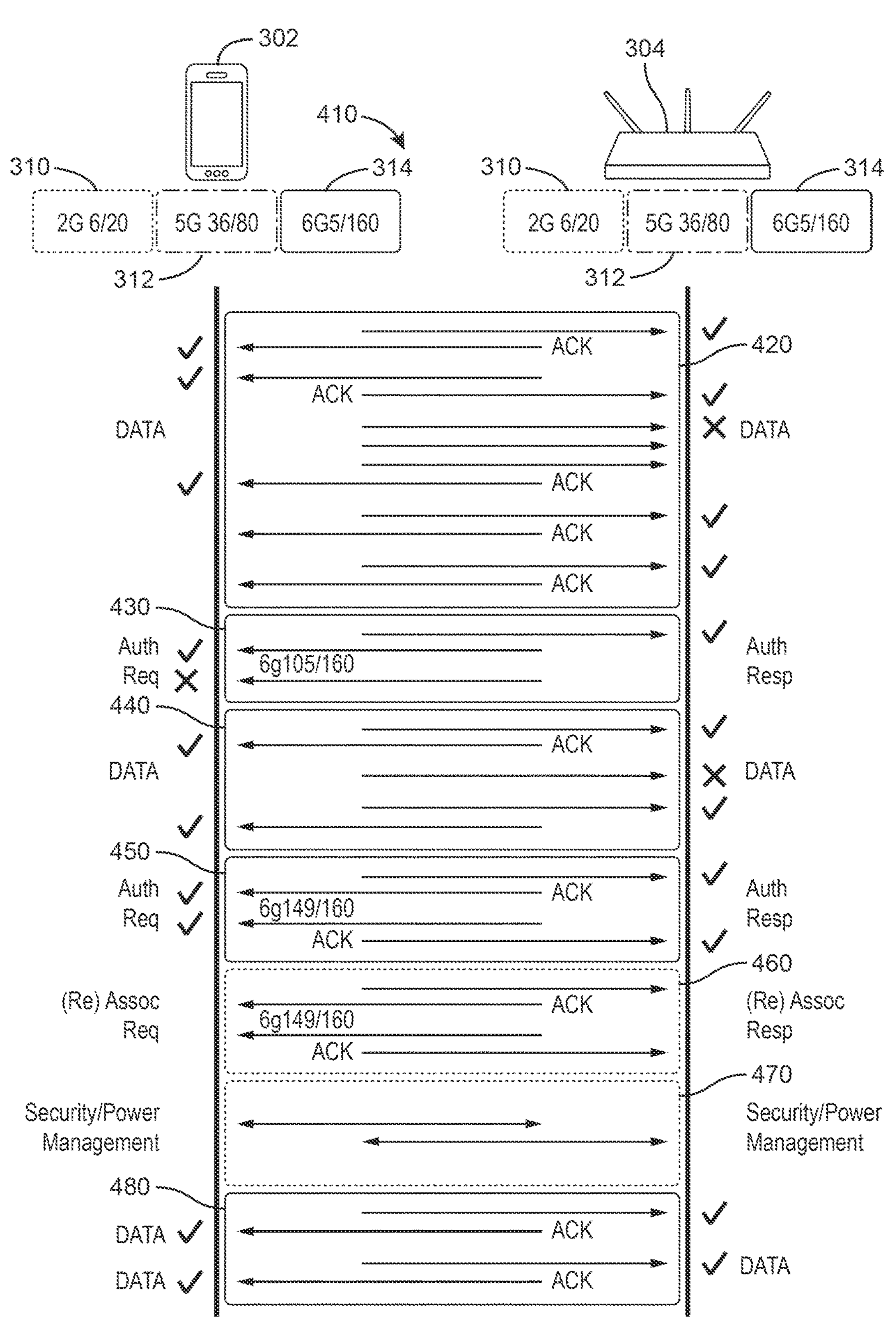
FIG. 4 is a timing diagram showing communication using multilink or dual link operations for the network illustrated in FIG. 2A according to some embodiments.

With reference to FIG. 4, client device 302 is communicating data with AP 304 using channel 314 in an operation 420. The existing data path on channel 314 is not robust (e.g., is choppy) and roam targets are available on channel 105 and 149 in the 6 G band during operation 420. Client device 302 and AP 304 suspend DMML operations and a roam attempt to switch channel 314 to channel 105 with a 160 MHZ bandwidth in the 6G band is made in operation 430. The roam attempt may reference to an operation where an authorization request frame is provided and a response frame is received. If the roam attempt from channel 314 to channel 105 in the 6G band fails (operation 430), the DMML operations are resumed in an operation 440 on channel 314.

A roam attempt to switch from channel 314 to channel 149 in the 6G band is made after suspending DMML operations in an operation 450. The roam attempt can be made in response to a failure in operation 440. As the roam attempt succeeds in operation 450 (e.g. successful authorization request and response), the channel is switched from channel 310 to channel 11 with a 20 MHZ bandwidth in the 2G band by AP 304 and an association operation is completed on channel 11 with a 20 MHZ bandwidth in operation 460. In some embodiments, an authorization operation is performed on channel 149 in operation 450. The authorization operation includes an authorization request from client device 302 and authorization response from AP 304 in some embodiments. The association operation includes an association request from client device 302 and association response from AP 304 in some embodiments. In some embodiments, channel 11 with a 20 MHZ bandwidth in the 2G band is used for security and power management frames in an operation 470. In operation 480, client device 302 and 304 communicate data frames as DMML operations resume (e.g., automatically) using channel 149 with a 160 MHz bandwidth in the 6G band in some embodiments.

In some embodiments, a DMML parameter value can be provided in a field to indicate that a device is DMML capable for operations as set forth above. For example, the DMML parameter may refer to a code, message or frame sent by the AP to a client device or vice versa to inform DMML capability in some embodiments. The frame may include a list of channels for selection for the connection when using DMML operations. The frame can be a special authentication frame or acknowledgement in some embodiments. In some embodiments, the DMML parameter is provided in a multilink control field.

In some embodiments, the channels in the 2G band are used for transmitting all the management frames including but not limited to beacon frames, probe request/response frames, association request/response frames, deauthentication frames, disassociation frames, PSP frames, etc. in some embodiments. The primary channel can be a core frequency segment for the BSS or AP in some embodiments. The secondary channels/sub-band channels (SCs) include the neighboring channels of the primary channel.

It should be noted that certain passages of this disclosure can reference terms such as "first" and "second" in connection with subsets of frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., STAs, APs, beam formers and/or beam formees) that can operate within a system or environment. It should be understood that the systems described above can provide multiple ones of any or each of those components and these components can be provided on either a standalone machine or, in some embodiments, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code. Circuitry may refer to any electronic circuits or circuits.

While the foregoing written description of the methods and systems enables one of ordinary skill to make and use embodiments thereof, those of ordinary skill will understand and appreciate the existence of variations, combinations, and equivalents of the specific embodiment, method, and examples herein. For example, specific values for bandwidths, channels and sub bands discussed above are exemplary. The present methods and systems should therefore not be limited by the above described embodiments, methods, and examples, but by all embodiments and methods within the scope and spirit of the disclosure.

What is claimed is:

1. A device, comprising:

a circuit configured to use a discovery operation and an association operation on a first channel in a first band and use a first data operation on a second channel in a second band after performing an authorization operation on the first channel, wherein the circuit is configured to use a second data operation on a third channel in a third band if interference is detected in the second channel and wherein the circuit is configured to use a third data operation on the first channel if a range between the device and an Access Point (AP) is greater than a threshold when the second data operation is used.

2. A device, comprising:

a circuit configured to use a discovery operation and an association operation on a first channel in a first band and use a first data operation on a second channel in a second band after performing an authorization operation on the first channel, wherein the circuit is configured to use a second data operation on a third channel in a third band if interference is detected in the second channel, and wherein the circuit is configured to provide at least one frame while a connection is being established, the at least one frame comprising data indicating that the device is capable of a data management multilink (DMML) operation.

3. The device of claim 2, wherein the circuit is further configured to use a third channel in the second band after performing another authorization operation on the third channel in the second band and another association operation on the first channel in the first band.

4. The device of claim 1, wherein the device comprises a station or an access point.

5. A first device for communicating with a second device, the first device comprising:

a processor configured to:

use a discovery operation and an association operation on a primary channel in a first band;

use a first data operation on a second channel in a second band after performing an authorization operation on the primary channel;

communicate with the second device using the primary channel;

detect occupation on the primary channel by a third device;

communicate with the second device using a secondary channel in response to the occupation by the third device, the secondary channel being chosen from a set of channels, the set of channels being determined at least partially in response to a frame exchanged during association of the first device and the second device;

use a second data operation on a third channel in a third band if interference is detected in the secondary channel; and one of: use a third data operation on the primary channel if a range between the first device and an Access Point (AP) is greater than a threshold when the second data operation is used, or provide at least one frame while a connection is being established, the frame comprising data indicating that the first device is capable of a data management multilink (DMML) operation.

6. The first device of claim 5, the processor is further configured to;

communicate with the second device using the primary channel when the occupation by the third device is completed.

7. The first device of claim 5, wherein the first device comprises a station (STA) device communicating via a protocol employing 20 MHz beacon signals.

8. The first device of claim 5, wherein the frame comprises a first capability of the first device and a second capability of the second device.

9. The first device of claim 8, wherein the first capability comprises a capability to perform a preamble decode operation in parallel on multiple channels.

10. The first device of claim 9, wherein a number of channels in the set of channels is less than or equal to a number of the multiple channels upon which the preamble decode operation is performed in parallel.

11. The first device of claim 8, wherein the second capability comprises a capability to perform a clear channel assessment operation in parallel on multiple channels.

12. The first device of claim 11, wherein the clear channel assessment operation comprises a virtual clear channel assessment operation.

13. The device of claim 2, wherein the circuit is configured to use a third data operation on the first channel if a range between the device and an AP is greater than a threshold when the second data operation is used.

14. The device of claim 2, wherein the device comprises a station or an access point.

15. The device of claim 2, wherein the DMML operation comprises:

performing one or more data transfers on at least one of the first band or the second band.

16. The device of claim 2, wherein the at least one frame is a control frame.

17. The device of claim 2, wherein, when using a DMML operation, association operations are only performed in the first band.

18. The device of claim 2, wherein the circuit is configured to disable the DMML operation in response to a low battery mode.

19. The device of claim 2, wherein the circuit is configured to:

transfer data on the second channel in the second band according to the DMML operation; and perform power management communications on the first channel in the first band according to the DMML operation.

20. The device of claim 2, wherein the circuit is configured to:

perform security communications on the first channel in the first band according to the DMML operation.

* * * * *